(12) United States Patent
Yang et al.

(10) Patent No.: US 7,376,649 B2
(45) Date of Patent: May 20, 2008

(54) RELEVANCY-BASED DATABASE RETRIEVAL AND DISPLAY TECHNIQUES

(75) Inventors: Tao Yang, Santa Barbara, CA (US); Wei Wang, Edison, NJ (US); Apostolos Gerasoulis, Highland Park, NJ (US)

(73) Assignee: IAC Search & Media, Inc., Oakland, CA (US)

( * ) Notice: Subject to any disclaimer, the term of this patent is extended or adjusted under 35 U.S.C. 154(b) by 288 days.

(21) Appl. No.: 11/347,193

(22) Filed: Feb. 2, 2006

(65) Prior Publication Data

US 2006/0129552 A1 Jun. 15, 2006

Related U.S. Application Data

(62) Division of application No. 10/156,260, filed on May 28, 2002, now Pat. No. 7,028,026.

(51) Int. Cl.
G06F 17/30 (2006.01)
(52) U.S. Cl. .............................. 707/5; 707/4
(58) Field of Classification Search ................ 707/3–5
See application file for complete search history.

(56) References Cited

U.S. PATENT DOCUMENTS

| | | | | |
|---|---|---|---|---|
| 6,269,368 B1 * | 7/2001 | Diamond | ...................... | 707/6 |
| 6,285,999 B1 * | 9/2001 | Page | ............................ | 707/5 |
| 6,389,436 B1 * | 5/2002 | Chakrabarti et al. | ........ | 715/513 |
| 6,523,026 B1 * | 2/2003 | Gillis | ............................ | 707/3 |
| 6,654,742 B1 * | 11/2003 | Kobayashi et al. | ............ | 707/7 |
| 6,741,981 B2 * | 5/2004 | McGreevy | ..................... | 707/3 |
| 6,941,321 B2 * | 9/2005 | Schuetze et al. | ........ | 707/103 R |
| 7,130,848 B2 * | 10/2006 | Oosta | ............................. | 707/5 |
| 7,272,594 B1 * | 9/2007 | Lynch et al. | .................... | 707/3 |

OTHER PUBLICATIONS

Bharat, Krishna, Andrei Broder, Monika Henzinger, Puneet Kumar, and Suresh Venkatasubramanian. "The Connectivity Server: Fast Access to Linkage Information on the Web." http://decweb.ethz.ch/WWW7/1938/com1938.htm. pp. 1-13, printed May 9, 2002.

Bharat, Krishna, and Monika R. Henzinger, "Improved Algorithms for Topic Distillation in a Hyperlinked Environment." ACM, Inc.: Melbourne, Australia. 1998. pp. 1-9, printed May 9, 2002.

Brin, Sergey, Lawerence Page. "The Anatomy of a Large-Scale Hypertextual Web Search Engine." http://www7.scu.edu.au/programme/fullpapers/1921/com1921.htm. pp. 1-20, printed May 9, 2002.

(Continued)

*Primary Examiner*—Yicun Wu
(74) *Attorney, Agent, or Firm*—Blakely, Sokoloff, Taylor & Zafman; Stephen M. De Klerk (57) ABSTRACT

Techniques to retrieve, rank and display data objects retrieved form a database are described. In particular, methods to assign a global ranking value to a data object based on a combination of that object's link-based (e.g., vector-space cluster analysis) and text-based (e.g., word frequency) ranks are described. Additional techniques to determine a set of concepts, topics or key words associated with each retrieved data objects are described.

17 Claims, 5 Drawing Sheets

OTHER PUBLICATIONS

Chakrabarti, Soumen, Byron E. Dom, Daivd Gibson, Ravi Kumar, Prabhakar Raghavan, Sridhar Rajagopalan, and Andrew Tomkins. "Experiments in Topic Distillation." http://www/almaden.ibm.com/cs/k53/abstract.html, pp. 1-6, printed May 9, 2002.

Chakrabarti, Soumen, Byron Dom, Prabhakar Raghavan, Sridhar Rajagopalan, Daivd Gibson, and Jon Kleinberg. "Automatic Resource Compilation by Analyzing Hyperlink Structure and Associated Text." http://www7.scu.edu.au/programme/fullpapers/1898/com1898.html. pp. 1-14, printed May 9, 2002.

Davison, Brian D., Apostolos Gerasoulis, Konstantinos Kleisouris, Yingfang Lu, Hyun-ju-Seo, Wei Wang, and Baohua Wu. "DiscoWeb: Applying Link Analysis to Web Search." http://www.cs.rutgers.edu/~davison/pubs/www99.html. pp. 1-4, printed May 9, 2002.

Dongarra, Jack J., Jeremy Du Croz, and Richard J. Hanson. "An Extended Set of Fortran Basic Linear Algebra Subprograms." ACM Transactions on Mathematical Software, vol. 14, No. 1, Mar. 1988. pp. 1-17, printed May 9, 2002.

Gibson, David, Jon Kleinberg, and Prabhakar Raghavan. "Inferring Web Communities from Link Topology." http://www.cs.cornell.edu/home/kleinber/ht98.ps. pp. 1-17, printed May 9, 2002.

Kleinberg, Jon M. "Authoritative Sources in a Hyperlinked Environment." http://www.cs.cornell.edu/home/kleinber/auth.pdf. pp. 1-34, printed May 9, 2002.

Mizruchi, Mark S., Peter Mariolis, Michael Schwartz, and Beth Mintz. Techniques for disaggregating centrality scores in social networks. In N. B. Tuma, editor, Sociological Methodology, pp. 26-48. Jossey-Bass, San Francisco, 1986.

Ng, Andrew Y., Alice X. Zhang, and Michael I. Jordan. Stable algorithms for link analysis. Proc. 24th International Conference on Research and Development in Information Retrieval (SIGIR), 2001.

Page, Lawrence, Sergey Brin, Rajeev Motwani, Terry Winograd. "The PageRank Citation Ranking: Bringing Order to the Web." http://dbpubs.stanford.edu:8090/pub/1999-66. MS Power Point Presentation. Jan. 29, 1998. pp. 1-20.

* cited by examiner

RELEVANCY-BASED DATABASE RETRIEVAL AND DISPLAY TECHNIQUES

This is a divisional of U.S. patent application No. 10/156,260, filed on May 28, 2002 now U.S. Pat. No. 7,028,026.

BACKGROUND

The invention relates generally to techniques for analyzing queries submitted to databases. More particularly, the invention provides techniques to retrieve, rank and display selected data objects using a ranking scheme based on each object's textual relevance to the query and any linking relationships that exist between the various retrieved data objects.

As the size of the World-Wide Web (the "Web") has increased, so has its importance as a data repository. It is currently estimated that the Web comprises approximately 150 million hosts and more than two billion web pages and is growing at a rate of approximately 100% per year. One aspect of this growth is that users can no longer browse multiple sources for the same or related information—there is simply to much of it. Thus, any search and retrieval technique applied to such a large and highly interconnected database must return only relevant results. The more relevant the returned results, the "better" the search.

Current search engines use a variety of techniques to determine what retrieved objects (e.g., documents) are relevant and which are not. For example, documents can be ranked based on (1) how many times a user's search terms appear in the document, and/or (2) how close the search terms are to the beginning of the document, and/or (3) the presence or absence of the search terms in the document's title or other specified sections. More recent search engines assign a rank for each page identified by a search based on a vector-space analysis scheme. Such schemes cluster groups of retrieved pages based on the number of references those pages receive (in-bound links) and/or the number of pages those pages reference (out-bound links). Recent improvements of these basic techniques assign a rank value to each page in terms of both the number of in-bound links it has and the importance of the pages providing those in-bound links (i.e., the quality of the out-bound links from predecessor documents). The "Google" search engine at http://www.google.com is one search engine employing this method.

While these techniques provide ranking metrics that are an improvement over prior text only weighting methods, they are typically static (that is, they are computed a priori and, as a result, are not able to address the variety of queries submitted by real users). Thus, it would be beneficial to provide a mechanism to dynamically rank a retrieved data object based on its textual relevancy to the submitted query and its interconnectivity to other retrieved data objects.

SUMMARY

In one embodiment the invention provides a method to rank and display a data objects based on a combination of the data object's link-based and text-basked ranking scores. A method in accordance with this embodiment includes identifying a plurality of data objects, assigning a link-based rank value to each of a first portion of the identified data objects, assigning a text-based rank value to each of a second portion of the identified data objects, assigning a global rank value to each of a third portion of the identified data objects, the global rank value based on a combination of an object's link-based and text-based rank values, and processing at least some of the third portion of identified data objects in accordance with their global rank value. In one aspect, the link-based rank value may be determined in accordance with a vector-space clustering technique.

In another embodiment the invention provides a method to identify and assign topic to data objects. A method in accordance with this embodiment includes identifying a plurality of data objects, identifying a plurality of level-1 groups from the plurality of identified data objects, each level-1 group including one or more of the identified plurality of data objects, assigning one or more topic terms to each level-1 group, each of the one or more topic terms associated with at least one of the identified data objects comprising a level-1 group, partitioning each level-1 group into one or more level-2 groups, each level-2 group associated with an identified topic term, merging those level-2 groups having topic terms that overlap by at least a specified amount, and processing the merged level-2 groups in accordance with their assigned topic terms.

Methods in accordance with the invention are particularly well suited, but not limited to, the run-time evaluation of user submitted queries against large databases. In addition, methods in accordance with any embodiment of the invention may be stored in any media that is readable and executable by a computer system.

DETAILED DESCRIPTION

The invention relates generally to techniques for analyzing queries submitted to databases. More particularly, techniques in accordance with the invention dynamically assign a global rank to a data object based on that object's connectivity with other data objects (e.g., hyperlinks) and the data object's textual relevancy to a user submitted query. One aspect of the invention displays retrieved data objects in accordance with their global rank. Another aspect of the invention dynamically assigns a data object to one or more groups based on a combination of its connectivity and textual relevancy characteristics or scores. In yet another aspect of the invention, concepts or keywords are derived for each identified group and displayed to the user.

The following descriptions are presented to enable a person of ordinary skill in the art to make and use the invention and are provided in the context of a web-based search engine. Various modifications to the described embodiments will be readily apparent to those skilled in the art and the general principles defined herein may be applied to other embodiments and applications without departing from the spirit and scope of the invention. Accordingly, the present invention is not intended to be limited to the specific embodiments described and, in particular, to a web-based search engine using authority and hub vector-space link analysis methods, but is to be accorded the widest scope consistent with the principles and features disclosed herein.

Figure 1:
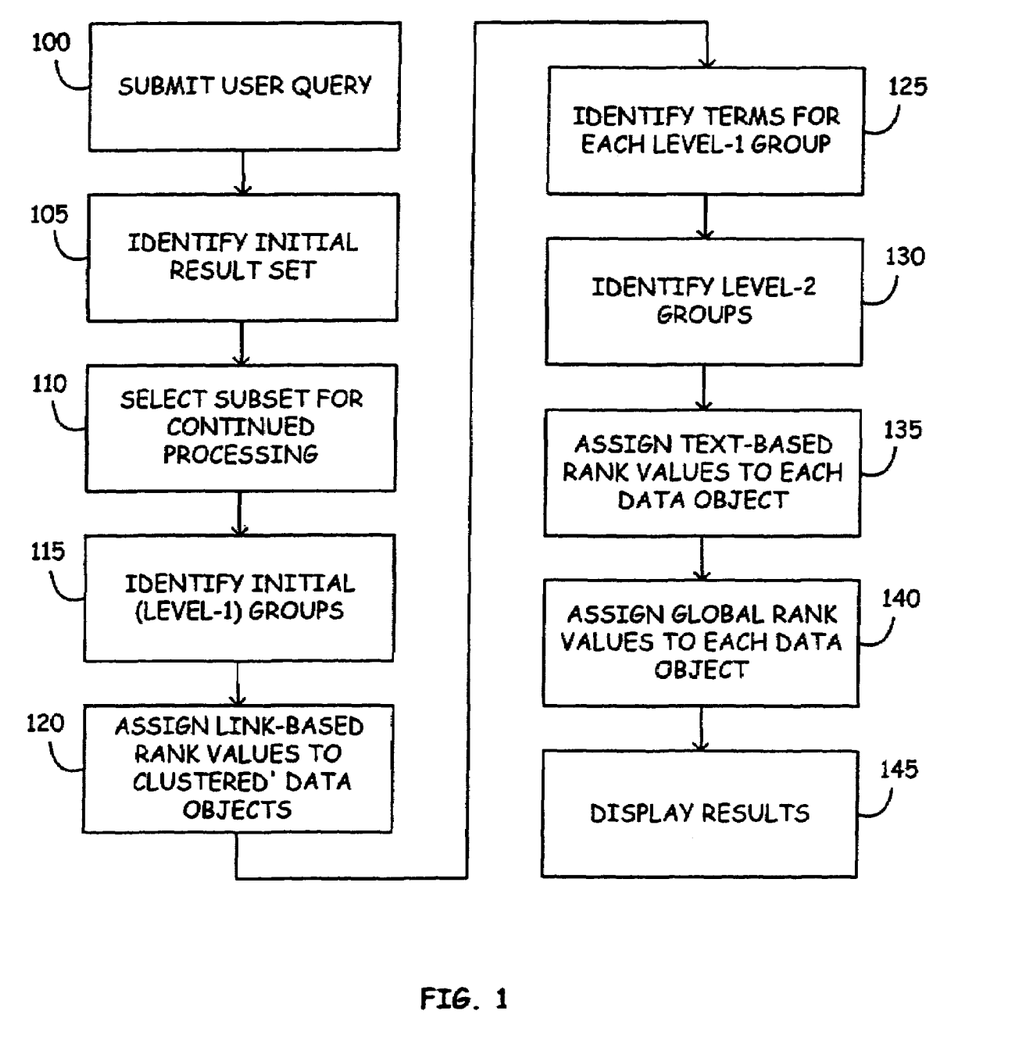
FIG. 1 shows, in flowchart form, the general outline of a relevancy-based database retrieval and display technique in accordance with the invention.

The general outline of a relevancy-based database retrieval and display technique in accordance with the invention is shown in FIG. 1. To begin, a query is submitted to a text-based search engine (block 100) which results in the identification and retrieval of a plurality of data objects—the initial result set (block 105). In one embodiment, a user-supplied query is used to retrieve a set of web pages where each web page relates to at least one word comprising the query. For example, each web page in the initial result set may include one or more of the words comprising the search query. The search may also return data objects related to the user-supplied query through, for example, synonym or root relationships. In another embodiment, a user-supplied query may include search constraints such as, for example, how close each query term must appear in a data object with respect to one another, and date limits or ranges.

Figure 2:
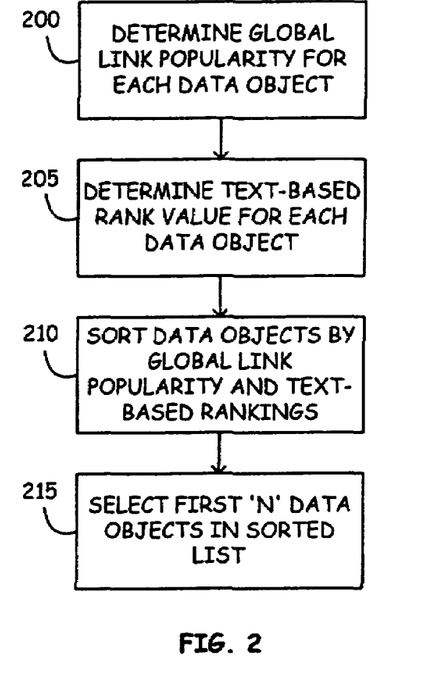
FIG. 2 shows, in flowchart form, a subset selection technique in accordance with one embodiment of the invention.

If the initial result set comprises more than a specified number of data objects (e.g., 'N'), a subset is chosen for continued processing (block 110). If, on the other hand, the initial result set comprises a number of data objects less than or equal to 'N', all of the initial result set may be chosen for continued processing. In one embodiment, the 'N' data objects having the highest total number of incoming links (referred to as the "Global Link Popularity") are selected for continued processing. In a web-based environment, it will be recognized that a web page's Global Link Popularity value is query independent—being only a function of the page's notoriety within the World Wide Web (the "Web"). In another embodiment, the 'N' data objects having the highest text-based rank values are selected for continued processing. (See discussion below regarding block 135 for a description of an illustrative text ranking scheme in accordance with the invention.) In yet another embodiment, these two methods may be combined as outlined in FIG. 2. Initially each data object is assigned a Global Link Popularity value (block 200) and a text-based ranking value (block 205). The data objects may then be sorted based on the combination (e.g., through a two-level sort) of their Global. Link Popularity and text-based ranking values (block 210), with the top 'N' data objects selected for continued processing (block 215). In yet another embodiment, the method of FIG. 2 may be modified such that text-based ranking values are determined (computed) for only a specified number of data objects. For example, text-based ranking values may be determined for only those '10N' data objects having the highest Global Link Popularity values, whereafter the acts of blocks 210 and 215 are applied to these '10N' data objects. This technique may yield a significant improvement in speed for subset determination (block 110 in FIG. 1) if the desired subset size 'N' is significantly smaller than the size of the initial result set.

Referring now to block 115 of FIG. 1, vector-space clustering techniques are used to identify an initial set of groups, hereinafter referred to as Level-1 groups. More specifically, any vector-space clustering technique may be used to aggregate a first portion of the selected subset of data objects into 'M' groups. A second portion of the selected data objects (those objects not a member of one of the 'M' groups) are aggregated into another group. Illustrative vector-space clustering techniques include, but are not limited to, defining clusters based on common predecessor nodes (referred to as authority-based clusters), common successor nodes (referred to as hub-based clusters) and total number of predecessor or successor nodes (referred to as popularity-based clusters). For expository purposes only, the examples discussed herein will assume an authority-hub clustering technique such as that introduced by Kleinberg et al. ("Authoritative Sources in a Hyperlinked Environment," 9th ACM-SIAM Symposium on Discrete Algorithms, 1998).

A consequence of using vector-space clustering techniques is that each of the 'M' groups may be represented by an eigenvector ($v_i$) whose non-zero elements correspond to the group's member data objects and an eigenvalue ($\lambda_i$), where 'i' is an index that runs from 1 to 'M'. (Hereinafter, those groups defined in terms of an eigenvector shall be referred to as an eigenvector group.) In one embodiment, 'M' may be determined by comparing the ratio of the eigenvalues associated with successively determined eigenvectors such that when the magnitude of the ratio between the current eigenvalue to the immediately prior eigenvalue drops below, for example, 0.1 no more eigenvectors are computed. In another embodiment, 'M' may be set to be no more than a constant—50, for example with a further constraint that eigenvector identification is halted if any eigenvalue's magnitude falls below a specified value.

Figure 3:
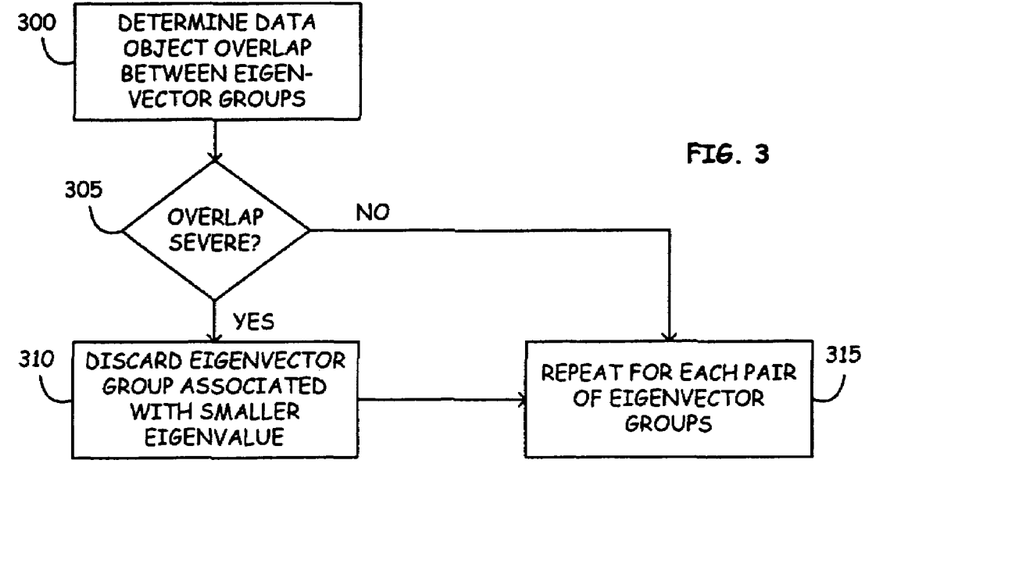
FIG. 3 shows, in flowchart form, a technique to reduce the number of initially determined eigenvector groups in accordance with one embodiment of the invention.

In some embodiments, the initial number of eigenvector groups CM) may be reduced in accordance with FIG. 3. As shown if FIG. 3, the amount of data object overlap between two eigenvector groups is determined (block 300) and, if the overlap is adjudged to be severe (the "yes" prong of diamond 305), that eigenvector group having the smaller eigenvalue is discarded (block 310). If the data object overlap between two eigenvector groups is not severe (the "no" prong of diamond 305), the acts of blocks 300-310 are repeated for the next pair of eigenvector groups until all eigenvector pairs have been evaluated (block 315). While the definition of "severe" is a matter of implementation choice, it has been found that a value of approximately ten percent (10%) yields good results for a general purpose web-based search engine. As used herein, the phrase "discarded" means to ignore. Data objects identified as belonging to a "discarded" eigenvector group and which are not in another eigenvector group that itself is not ignored, are shifted into that group that was not one of the originally defined 'M' eigenvector groups. For simplicity, regardless whether the acts of FIG. 3 are implemented, the number of Level-1 groups will be taken to be "M+1": 'M' eigenvector groups and 1 group comprising all those data objects not in any of the 'M' eigenvector groups (see discussion above).

One of ordinary skill in the art will recognize that each eigenvector group has an associated eigenvalue (representing that group's importance relative to the other identified groups), and that each data object in an eigenvector group has an associated intragroup weight value (representing each object's importance relative to the other objects in the same eigenvector group). One of ordinary skill in the art will further recognize that vector-space clustering techniques operate over graph representations of the data objects—typically in the form of a square connectivity matrix having $N^2$ elements (where 'N' is the number of data objects selected during the acts of block 110).

Figure 4:
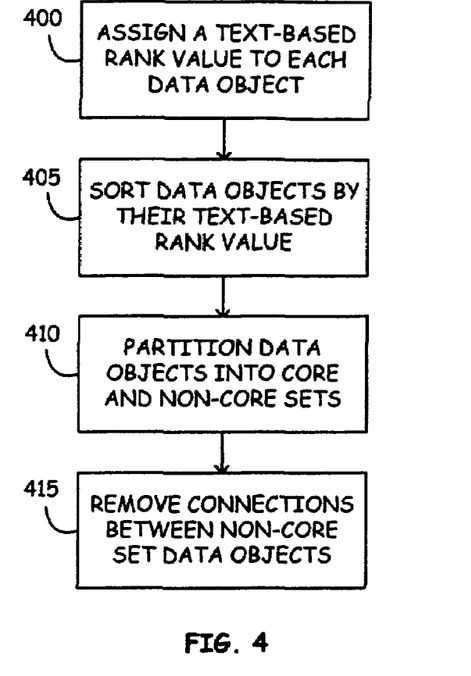
FIG. 4 shows, in flowchart form, how to reduce the complexity of a connectivity matrix in accordance with one embodiment of the invention.

In some embodiments, the complexity of the connectivity matrix associated with the data objects selected during block 110 may be reduced to improve the speed at which the Level-1 groups can be identified. For example, connections (e.g., links) between selectively identified data objects may be eliminated in accordance with FIG. 4. As shown in FIG. 4, each data object is assigned a text-based ranking value (block 400) and then sorted in accordance with this value (block 405). (See discussion below regarding block 135 for a description of an illustrative text-based ranking scheme in accordance with the invention.) Those data objects having a text-based ranking value greater than or equal to a specified value are said to be in the "core" set; all other data objects are said to be in the "non-core" set (block 410). Once the core and non-core sets are identified, connections between non-core set data objects may be removed (block 415). It has been found that this technique alone can substantially reduce the amount of time required to identify the Level-1 groups.

Figure 5:
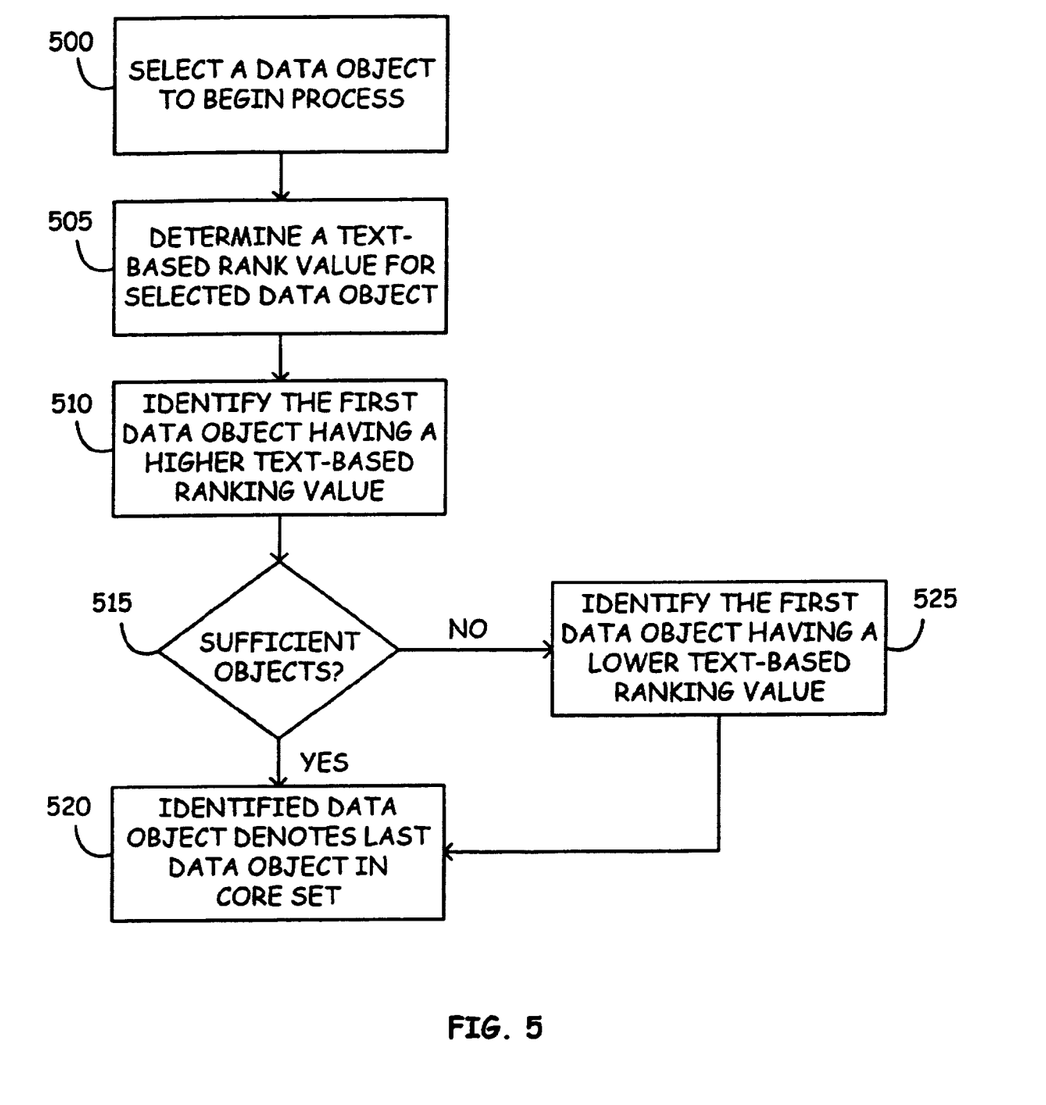
FIG. 5 shows, in flowchart form, a core set determination process in accordance with one embodiment of the invention.

In one embodiment, the specified values used during the partitioning operations of block 410 is that value half-way (or two-thirds, or one-third, or one-fourth, etc.) between the highest and lowest text-based ranking values. In another embodiment, the specified value is selected in accordance with FIG. 5. As shown in FIG. 5, a data object in the sorted list of data objects (see block 405 in FIG. 4) is selected that occupies a specified position in the sorted list (block 500). For example, the 500th data object (from that data object having the lowest text-based ranking value) in a list of 15,000 data objects may be selected. Once selected, that data object's text-based ranking value is determined (block 505). Each data object in the sorted list is checked in sequence (moving toward higher text-based ranking values) until a data object is found that has a higher text-based ranking value (block 510). If the number of data objects above and including the data object identified in block 510 is greater than or equal to a specified threshold such as, for example, 200 (the "yes" prong of diamond 515), those data objects comprise the "core" set while all those data objects in the sorted list below the data object identified in block 510 comprise the "non-core" set (block 520). If the number of data objects remaining above and including the data object identified in block 510 is less than the specified threshold (the "no" prong of diamond 515), the actions of block 510 are repeated moving down (toward lower text-based ranking values) the sorted list of data objects (block 525).

In other embodiments, the complexity of the connectivity matrix may be further reduced by eliminating those rows and columns that comprise only zero values (or values smaller than a specified threshold such as, for example, $10^{-4}$) If the number of rows and columns eliminated are not equal, the connectivity matrix becomes non-square. It has been found that this technique alone can substantially reduce the amount of time required to identify the Level-1 groups.

In general, any desired method may be used to solve for the eigenvector-eigenvalue pairs associated with the connection matrix. It has been found beneficial, however, to use sub-space iteration techniques as embodied in the publicly available software routines known as LAPACK. A user guide for this software is available at http://www.netlib.org/lapack/lug/lapack_lug.html. In addition, it has been found advantageous to use specialized routines such as is those described by Dongarra et al. ("An extended set of FOR-TRAN Basic Linear Algebra Subprograms," ACM Trans. Math. Soft., Vol. 14, No. 1, 1988, pp. 1-17).

Referring now to block 120 of FIG. 1, each data object (e.g., the ith data object) participating in one of the 'M' Level-1 eigenvector groups may be assigned a link-based rank value (e.g., $l_i$) in accordance with the following equation:

$$L = \sum_{j=1}^{M} |\lambda_j|^a \times |v_j|,$$

L represents the vector whose elements are the individual data object link-based rank values (e.g., $l_1, l_2, \ldots$), $\lambda_j$ is the eigenvalue associated with the jth eigenvector, $v_j$ is the jth eigenvector, 'a' is a scalar weighting factor, 'i' is an index that runs from 1 to the total number of data objects in the 'M' eigenvector groups and 'j' is an index that runs from 1 to the total number of eigenvector groups, 'M'.

When scalar weighting factor a=0, the link-based ranking value for a data object reduces to a linear sum of that data object's intragroup weight values (see discussion above regarding eigenvalues and intragroup weight values). On the other hand, when scalar weighting factor a≠0, a data object's link-based ranking value emphasizes (when a≧1) or deemphasizes (when 0<a<1) the importance of that data object's appearance in multiple eigenvector groups relative to those data objects that appear in fewer eigenvector groups. One of ordinary skill in the art will recognize that an object's link-based ranking value may be normalized. One illustrative normalization technique is to divide each computed link-based ranking value by the largest link-based ranking value. One of ordinary skill in the art will also recognize that weighting factor 'a' may be a constant multiplier of a group's eigenvalue rather than a power thereof. In addition, weighting factor 'a' could also be expressed as a function of, for example, the total number of groups and/or the total number of data objects. It will also be recognized that a link-based ranking scheme may use algebraic operators other than summation and absolute value operations.

Figure 6:
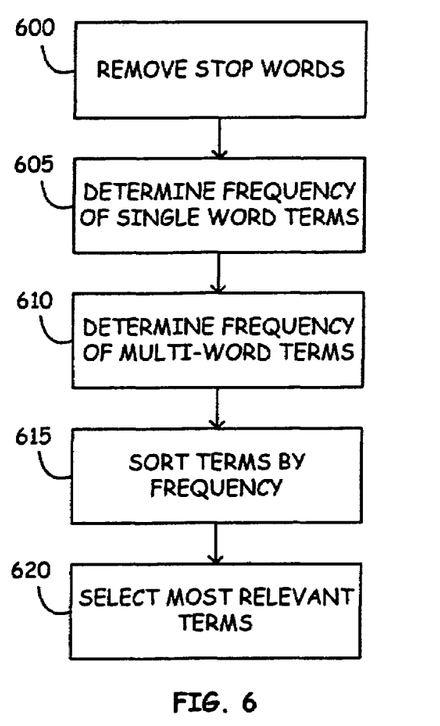
FIG. 6 shows, in flowchart form, a method to identify relevant terms for each Level-1 group in accordance with one embodiment of the invention.

Referring now to block 125 of FIG. 1, each of the M+1 Level-1 groups are interrogated to determine relevant textual terms associated with the data objects comprising the group. As will be shown below, these terms form the basis for the identification of topics or keywords and provide one means to display only the most textually relevant data objects to a user in response to the user's query. In one embodiment, terms are identified in accordance with FIG. 6. Initially, common stop words in the textual information associated with each data object are removed (block 600) and the number of times each remaining word is found in the collection of data objects comprising the Level-1 group is determined (block 605). If two word terms are desired, the number of times each two consecutive word combination is found in the collection of data objects comprising the Level-1 group is determined. The number of three, four, or more consecutive word combinations may be found in a similar manner (block 610). Similarly, word combinations may be defined in terms of their proximity. For example, a two word combination may be comprise two words that are repeatedly found within 'X' words of one another. Once identified, the terms may be sorted in accordance with their frequency of use (block 615) and the most significant terms selected for further use (block 620). In one embodiment, the 'X' most frequent terms (e.g., 40, or 50) are selected during block 620. In another embodiment, only those terms that appear more than 'Y' times (e.g., 3 or 5) are selected. In yet another embodiment, up to the first 'X' terms that appear more than 'Y' times are selected. In still another embodiment, the most frequently used 3 word terms are selected (subject to a first minimum use threshold), followed by the most frequently used 2 word terms (subject to a second minimum use threshold), followed by the most frequently used single word terms (subject to a third minimum use threshold). In addition, the total number of selected terms may be capped at a maximum such as, for example, 40 or 50. In yet another embodiment, each term is first assigned a weighted value that reflects the use of that term within the Level-1 group. By way of example, each use of a single word term may be assigned a weight of 1, each use of a two word term may be assigned a weight of 3, each use of a three word term may be assigned a weight of 6, etc. The effect of this, or a similar scheme, is to assign more importance to each use of a multiple word term than to the sum of the individual words in the term. The terms may then be sorted in accordance with their weighted values and the most highly weighted 'X' terms selected for further use. In one implementation, 'X' is 50. In another implementation, 'X' is capped at fifty with the further restriction that any selected term must appear at least 'Y' times, where 'Y' may be any desired lower threshold—3 for example.

Figure 7:
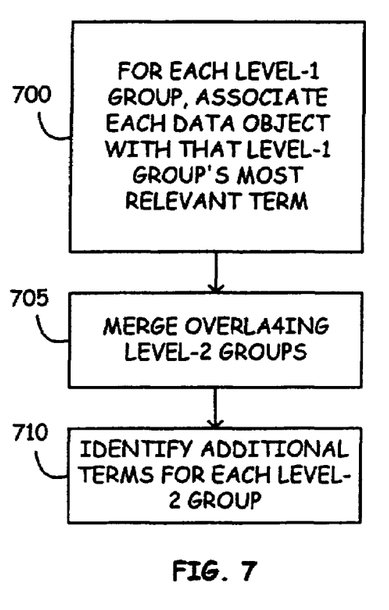
FIG. 7 shows, in flowchart form, a method to identify Level-2 groups in accordance with one embodiment of the invention.

Referring again to FIG. 1, each Level-1 group is now partitioned into a number of Level-2 groups, where each Level-2 group is associated with one, or a few, key terms representing the central or primary topics, keywords or concepts that each of that Level-2 group's constituent data objects most closely embodies (block 130). In one embodiment, identification of Level-2 groups is performed in accordance with FIG. 7. Initially, each data object in each Level-1 group is associated with that Level-1 group's term to which it is most closely related based on a weighted frequency count (block 700). As a result, each Level-1 group is partitioned into a number of subgroups equal to the number of terms identified during block 125 of FIG. 1. Each subgroup may comprise zero or more data objects. Next, all of the subgroups (across all Level-1 groups) are checked against one another and, if the terms between two different subgroups overlap by a specified amount, the subgroups are merged (block 705). That is, if the terms between two subgroups overlap by more than 'X' percent, the data objects associated with each individual subgroup are combined and each unique term of the two subgroups are associated with the merged subgroup. The resulting merged subgroups are referred to as Level-2 groups and the terms associated with each Level-2 group represents the topics, keywords or concepts for that Level-2 group's constituent data objects. Advantageously, each Level-2 group may have additional terms associated with it (block 710). For example, an additional 1 to 5 terms may be associated with each Level-2 group using the frequency count technique described above in connection with block 125 of FIG. 1.

In one embodiment, a data object's weighted frequency count for a given Level-1 group may be based on a matrix representation of that group's term count data (see discussion above regarding block 125 of FIG. 1). In this representation, each term identified during block 125 is represented by a row in the matrix, each data object in the group is represented by a column in the matrix, and the value in the ith row and jth column is the number of times the ith term appears in the jth data object ($c_{ij}$). With this background, the weighted frequency count corresponding to the ith term and the jth data object ($w_{ij}$) in a given Level-1 group may be determined in accordance with the following equation:

$$w_{ij} = a \, \log(LEN(t_i)) + b \, \log(c_{ij}), \text{ where}$$

$LEN(t_i)$ represents the length or number of words in the ith term, and a and b are scalar weighting factors. Having determined a Level-1 group's weighted frequency counts, each data object in the Level-1 group is assigned to that subgroup corresponding to the term having the largest $w_{ij}$ value (block 700). One of ordinary skill in the art will recognize that if all terms are single words, each data object may be assigned to that subgroup corresponding to the term having the largest frequency count value ($c_{ij}$) and the multi-word term scaling factor 'a' may be set to zero (0). In some embodiments both the $LEN(t_i)$ (length) and $c_{ij}$ (frequency count) values are scaled so that their numeric ranges are approximately equal so that their combination (a sum in the illustrative technique described above) gives approximate equal weight to each factor. One of ordinary skill in the art will understand that this may also be accomplished through the appropriate choice of weighting factors 'a' and 'b'. In one embodiment, for example, the scaling factors 'a' and 'b' are set to 0.5 and the $LEN(t_i)$ operation provides the 'log' of the number of words in term $t_i$. It will further be understood that one of the above factors (length or frequency count) may be weighted more heavily than the other. It will also be understood that weighting schemes other than that illustrated above may be used to combine the influence of a term's length and frequency.

Figure 8:
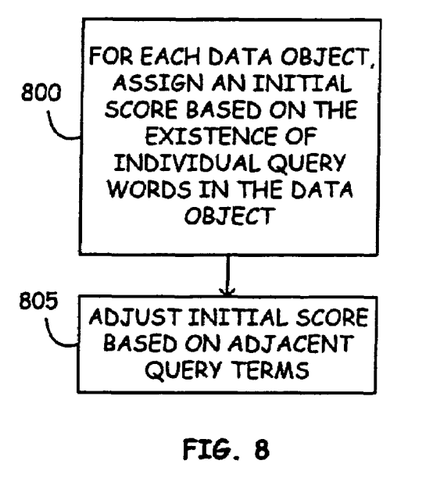
FIG. 8 shows, in flowchart form, a data object scoring scheme in accordance with one embodiment of the invention.

Referring now to block 135 of FIG. 1, data objects selected for processing in accordance with block 110 of FIG. 1 are assigned a text-based ranking value in accordance with FIG. 8. As shown, data objects are assigned an initial score based on whether each word in a user-submitted query is found in the data object's associated text (block 800). This initial score may also be influenced by where a query word is found in the data object. In a web-based implementation for example, each web page may receive 'F' points for each query word found in its "Title" section and 'G' points for each query word found in its "Body" section. In another embodiment, a data object's initial score may also include points for words related to the query terms. For example, one or more of the query terms may have associated synonyms and/or root words. Points for these "related words" may be included in the data object's initial score. The initial score is then adjusted to account for those query words that appear adjacent to one another in the data object (block 805). It is common that stop words in the data objects are ignored for this operation. Additional points for adjacent "related words" may also be used to adjust a data object's initial score (see discussion above). In the web-based implementation introduced above, each web page may receive an additional 'H' points for each consecutive pair of query words found in its "Title" section and an additional 'I' points for each consecutive pair of query words found in its "Body" section. In one web-based implementation, it has been found beneficial to use a G:I:F:H ratio of approximately 1:8:16:24. For example, if G is set equal to 1, then I equals 8, F equals 16 and H equals 24. One of ordinary skill in the art will recognize that different point values and distributions may be used. In addition, a data object may be divided into more, or fewer, parts. For example, a document may include a title, various headings, an abstract, summary, etc. Similarly, a web page may be modeled as having more or fewer sections.

Figure 9:
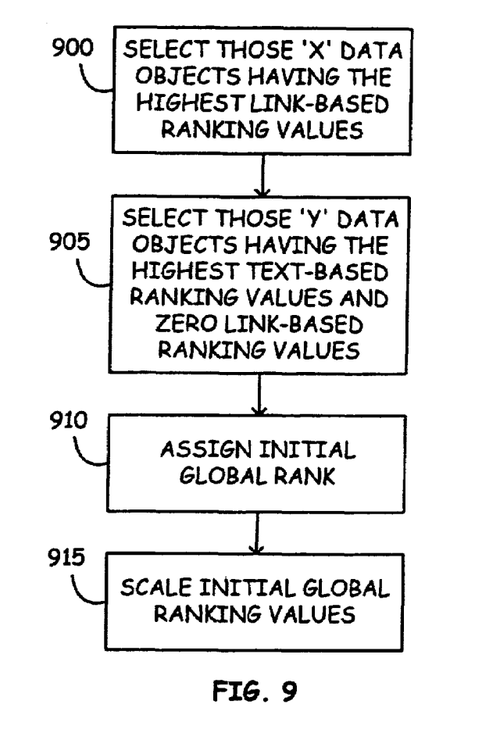
FIG. 9 shows, in flowchart form, a method to assign global ranking values to selected data objects in accordance with one embodiment of the invention.

Referring now to block 140 of FIG. 1, global ranking values are assigned in accordance with FIG. 9. First, the 'X' data objects having the highest link-based ranking values (determined in accordance with block 120 of FIG. 1) are selected (block 900). Next, the 'Y' data objects having the highest text-based ranking value (determined in accordance with block 135 of FIG. 1) and a zero link-based ranking value are selected. In one embodiment, the sum of X+Y is chosen to be slightly more than the number of pages which are returned to the user. For example, if a maximum of 200 pages are to be displayed to the user, then 'X' may be chosen to be 200 and 'Y' may be chosen to be 10. In other embodiments, the sum of X+Y could be set equal to any desired value such as, for example, the total number of data objects selected during block 110 of FIG. 1. Each of the selected X+Y data objects are assigned an initial global ranking value based on the objects' individual link- and text-based ranking values (block 910) which may then be adjusted to account for the range of the individual data objects' score (block 915).

In one embodiment, the initial global ranking value of block 910 for the ith data object ($g_i$) is made in accordance with the following equation:

$$l_{min} - \frac{a}{t_i},$$

$l_i$ represents the link-based ranking value assigned to the ith data object in accordance with block 120 of FIG. 1, $l_{min}$ represents the minimum link-based ranking value among the X+Y selected data objects, $t_i$ represents the text-based ranking value assigned to the ith data object in accordance with block 135 of FIG. 1, and 'a' represents a scaling factor. Conceptually, the $-(a \div l_{min})$ term ensures that all selected data objects having zero link-based ranking value are ranked lower than any page having a non-zero link-based ranking value and, further, that the lower the data object's text-based ranking value, the lower its initial rank. In a general purpose web-based search engine embodiment, it has been found that a positive value between 1 and 2 for 'a' provides adequate scaling. In the same embodiment, the final global ranking value of block 915 for the ith data object ($G_i$) is made in accordance with the following equation:

$$g_i \left[ 1 + \left( \frac{g_{max}}{g_{min}} - 1 \right) \left( \frac{t_i}{t_{max}} \right)^b \right],$$

$g_{max}$ represents the maximum initial global ranking value as determined in accordance with block 910, $g_{min}$ represents the minimum ranking value among the X+Y selected data objects, $t_{max}$ represents the maximum text-based ranking value among the X+Y selected data objects, and 'b' represents a weighting factor. Conceptually, the $\{(g_{max} \div g_{min}) - 1\}$ factor tends to move data objects having a high text-based ranking value, but low link-based ranking value, up in the overall rankings while the $(t_i \div t_{max})^b$ factor penalizes those web pages whose text-based rank value is relatively small compared to the maximum text-based ranking value for the selected X+Y web pages.

Referring now to block 145 of FIG. 1, the X+Y data objects ranked in accordance with FIG. 9 are displayed to the user. In a web-based embodiment, a title, a hyperlink or Uniform Resource Locator (URL) and perhaps a brief description of the data object (e.g., web page) or any other suitable representation of the data object is displayed for the user. In one embodiment, the globally ranked data objects are displayed in a first portion of a display in a highest-to-lowest value sequence. In another embodiment, the terms associated with Level-2 groups (see block 130 of FIG. 1) are displayed in a second portion of the display in a largest-to-smallest sequence. For example, that term or terms associated with the largest Level-2 group may be displayed first, followed the term or terms associated with the next largest Level-2 group and so forth. Alternatively, only those terms associated with Level-2 groups having more than a specified number of data objects (e.g., 10) are displayed. In yet another embodiment, the number of data objects and/or terms may be limited to a specified number at any given time. For example, only 20 data objects and 5 terms may be displayed at a time. In still another embodiment, a "More Like This" link may be displayed with each displayed data object such that, when selected, those data objects in the same Level-2 group as the (originally) displayed data object are displayed for the user. If the displayed data object appears in more than one Level-2 group, either the largest (smallest) of the groups or the combination of the groups may be displayed. In still another embodiment, a specified number of web pages having a large number of outgoing links (to those pages selected in accordance with block 110 of FIG. 1)—referred to as "hubs"—may be displayed to the user in a third portion of the display.

Various changes in the details of the illustrated operational methods are possible without departing from the scope of the following claims. For instance, different specific techniques (e.g., equations) from those illustrated herein to determine a data object's link-based and text-based ranking values may be used without departing from the claimed invention. Similarly, different specific means for combining a data object's text- and link-based ranking values may be used from those illustrated herein without departing from the invention.

It will also be recognized by those of ordinary skill in the art of computer programming that the methods of FIGS. 1-9 may be embodied as a series of instructions organized into one or more computer programs which are executable by a programmable control device. A programmable control device may be a single computer processor, a plurality of computer processors coupled by a communications link, or a custom designed state machine. Custom designed state machines may be embodied in a hardware device such as a printed circuit board comprising discrete logic, specially designed application specific integrated circuits (ASICs), or integrated circuits such as field programmable gate arrays (FPGAs). Storage devices suitable for tangibly embodying computer programs include all forms of non-volatile memory including, but not limited to: semiconductor memory devices such as electrically programmable read only memory (EPROM), electrically erasable programmable read only memory (EEPROM), and flash devices; magnetic disks (fixed, floppy, and removable); other magnetic media such as tape; and optical media such as CD-ROM disks.

While the invention has been disclosed with respect to a limited number of embodiments, numerous modifications and variations will be appreciated by those skilled in the art. It is intended, therefore, that the following claims cover all such modifications and variations that may fall within the true sprit and scope of the invention.

What is claimed is:

1. A method to assign topic terms to a plurality of data objects, comprising:
    identifying a plurality of data objects;

identifying a plurality of level-1 groups from the plurality of identified data objects, each level-1 group including one or more of the identified plurality of data objects;

assigning one or more topic terms to each level-1 group, each of the one or more topic terms associated with at least one of the identified data objects comprising a level-1 group;

partitioning each level-1 group into one or more level-2 groups, each level-2 group associated with an identified topic term;

merging those level-2 groups having topic terms that overlap by at least a specified amount; and processing the merged level-2 groups in accordance with their assigned topic terms.

2. The method of claim 1, wherein the act of identifying a plurality of level-1 groups comprises:

identifying one or more clusters within the identified plurality of data objects based on a vector-space clustering technique, each cluster representing a level-1 group; and identifying an additional level-1 group comprising all those identified data objects not a member of the identified one or more clusters.

3. The method of claim 1, wherein the act of assigning one or more topic terms with each level-1 group comprises identifying significant single word terms associated with the identified plurality of data objects.

4. The method of claim 1, further comprising identifying significant multiple word terms associated with the identified plurality of data objects.

5. The method of claim 1, wherein the act of assigning one or more topic terms to a level-1 group comprises:

identifying terms based on their frequency of occurrence within each data object comprising the level-1 group;

selecting those terms that occur a significant number of times; and assigning those terms identified as significant as topic terms for that level-1 group.

6. The method of claim 5, wherein the act of selecting those terms that occur a significant number of times comprises selecting those terms that appear more than a specified number of times.

7. The method of claim 5, wherein the act of identifying terms comprises identifying single word terms.

8. The method of claim 7, wherein the act of identifying terms comprises identifying multiple word terms.

9. The method of claim 1, wherein the act of partitioning each level-1 group into one or more level-2 groups further comprises assigning zero or more additional topic terms to each level-2 group.

10. The method of claim 1, wherein the act of merging two level-2 groups comprises merging those level-2 groups into a single level-2 group if the words comprising a topic term common to the two level-2 groups overlap by at least a specified number of words.

11. The method of claim 10, wherein the specified number of words is two-thirds of the total number of words comprising the topic terms.

12. The method of claim 1, wherein the act of processing the merged level-2 groups in accordance with their assigned topic terms comprises displaying at least some of the topic terms to a user such that when selected by the user, identifiers for the data objects associated with the topic term's level-2 group are displayed.

13. The method of claim 1, wherein the acts of identifying are performed at run-time.

14. The method of claim 1, wherein the act of assigning, partitioning and merging are performed at run-time.

15. The method of claim 1, wherein the act of identifying a plurality of data objects comprises identifying a plurality of documents.

16. The method of claim 15, wherein the act of assigning one or more topic terms to each level-1 group, comprises associated terms found in a title section of one or more of the plurality of documents.

17. The method of claim 16, wherein the act of identifying a plurality of documents comprises identifying a plurality of web pages.

* * * * *